United States Patent
Chang et al.

(10) Patent No.: US 9,446,754 B2
(45) Date of Patent: Sep. 20, 2016

(54) SYSTEM AND METHOD OF CONTROLLING STARTING OF VEHICLE

(71) Applicants: Hyundai Motor Company, Seoul (KR); Kia Motors Corporation, Seoul (KR)

(72) Inventors: Joseph D Chang, Yongin-si (KR); Byeong Wook Jeon, Seoul (KR); Dong Hoon Jeong, Osan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 344 days.

(21) Appl. No.: 14/104,553

(22) Filed: Dec. 12, 2013

(65) Prior Publication Data

US 2015/0019113 A1    Jan. 15, 2015

(30) Foreign Application Priority Data

Jul. 11, 2013   (KR) .................. 10-2013-0081596

(51) Int. Cl.
| | | |
|---|---|---|
| F02N 11/08 | (2006.01) | |
| B60W 10/06 | (2006.01) | |
| B60W 10/11 | (2012.01) | |
| B60W 30/18 | (2012.01) | |

(52) U.S. Cl.
CPC ............. *B60W 10/06* (2013.01); *B60W 10/11* (2013.01); *B60W 30/18018* (2013.01); *B60K 2310/26* (2013.01); *B60W 2520/10* (2013.01); *B60W 2540/10* (2013.01); *B60W 2540/12* (2013.01); *B60W 2550/308* (2013.01); *B60W 2710/0666* (2013.01)

(58) Field of Classification Search
CPC .................. B60K 31/0008; B60K 2031/0016; B60K 2031/0025; B60W 30/16; B60W 30/17; B60W 30/18018; F02D 41/062
USPC ....... 701/93, 96, 113, 115; 123/179.3, 179.4
See application file for complete search history.

(56) References Cited

U.S. PATENT DOCUMENTS

| | | | | | |
|---|---|---|---|---|---|
| 5,451,820 | A  * | 9/1995 | Gotoh | ................ | B60K 31/0008 123/179.4 |
| 6,195,157 | B1 * | 2/2001 | Yamashita | ................ | B60T 7/22 180/169 |
| 6,332,108 | B1 * | 12/2001 | Hirasago | ............ | B60K 31/0008 340/435 |
| 8,073,606 | B2 * | 12/2011 | Isaji | ...................... | B60W 30/16 340/435 |
| 8,352,147 | B2 * | 1/2013 | Miyake | .................. | B62K 3/007 701/117 |

(Continued)

FOREIGN PATENT DOCUMENTS

| | | |
|---|---|---|
| JP | 2005-76772 A | 3/2005 |
| JP | 2009-156304 A | 7/2009 |

(Continued)

*Primary Examiner* — Thomas Moulis
(74) *Attorney, Agent, or Firm* — Morgan, Lewis & Bockius LLP

(57) ABSTRACT

A system of controlling starting of a vehicle may include a vehicle speed sensor detecting vehicle speed, an accelerator pedal position sensor detecting position of an accelerator pedal, a brake pedal position sensor detecting when a brake pedal may be operated or not, a distance sensor detecting a distance from a previous vehicle, a timer detecting time lapse from particular time, and a controller electrically connected to the vehicle speed sensor, the accelerator pedal position sensor, the brake pedal position sensor, the distance sensor and the timer, and adapted to change starting pattern according to the distance from the previous vehicle and to perform starting control according to the changed starting pattern when the vehicle may be started in a stopped state.

12 Claims, 3 Drawing Sheets

(56) References Cited

U.S. PATENT DOCUMENTS

| | | | | |
|---|---|---|---|---|
| 2002/0133285 | A1* | 9/2002 | Hirasago | B60K 31/0008 701/96 |
| 2005/0216169 | A1* | 9/2005 | Arai | B60K 31/0008 701/96 |
| 2006/0095194 | A1* | 5/2006 | Arai | B60T 7/12 701/96 |
| 2006/0265115 | A1* | 11/2006 | Etori | B60W 30/17 701/96 |
| 2011/0257862 | A1* | 10/2011 | Lee | B60T 7/22 701/96 |
| 2012/0277982 | A1* | 11/2012 | Weaver | F02N 11/0837 701/112 |
| 2013/0304335 | A1* | 11/2013 | Suzuki | B60W 10/184 701/51 |
| 2015/0275840 | A1* | 10/2015 | Sawada | F02N 11/0837 701/113 |

FOREIGN PATENT DOCUMENTS

| | | |
|---|---|---|
| KR | 10-0527708 B1 | 11/2005 |
| KR | 10-2009-0062527 A | 6/2009 |

\* cited by examiner

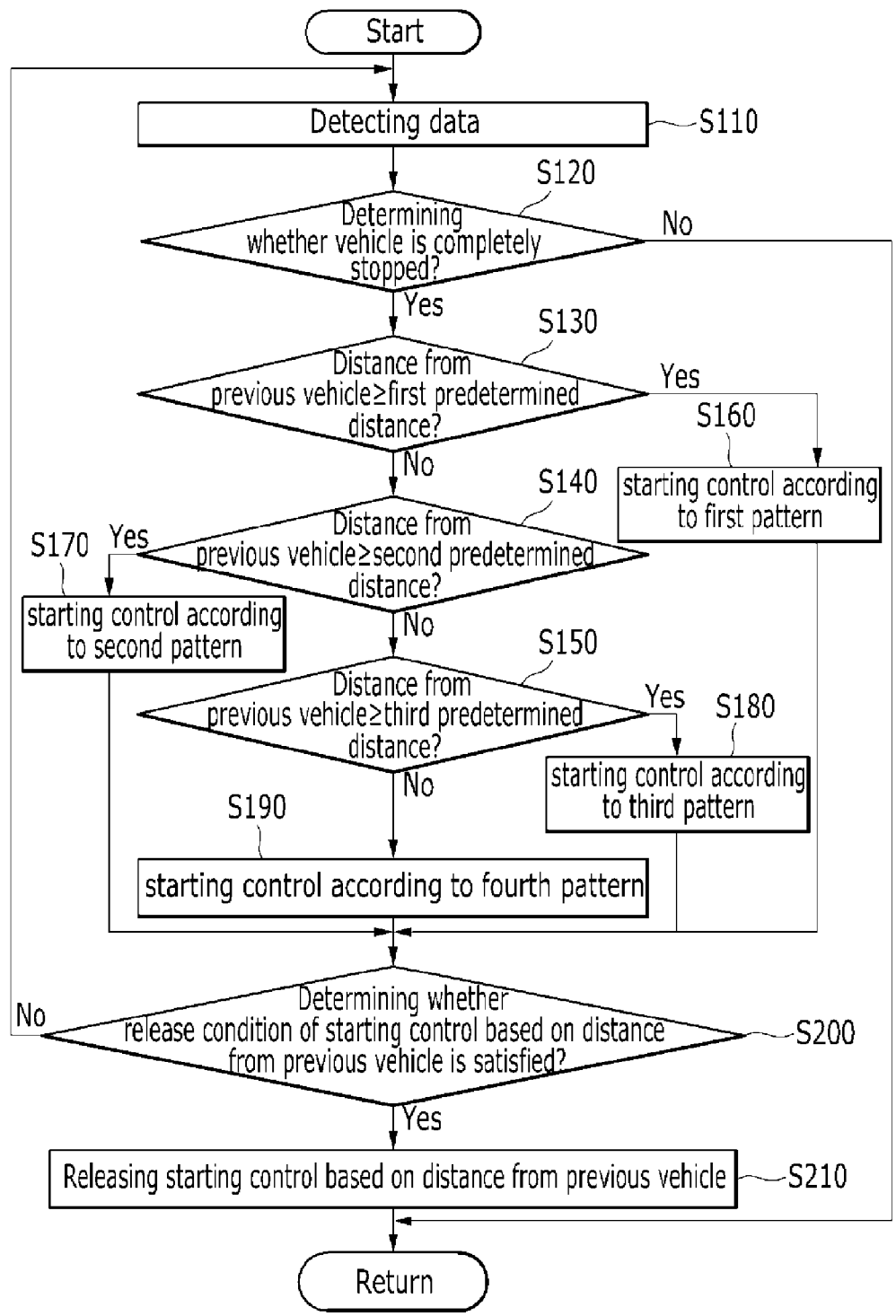

FIG.3

| Starting pattern | Shift-speed | Engine torque control |
|---|---|---|
| First pattern | First forward speed | Normal torque filter and normal torque map |
| Second pattern | First forward speed | Mild torque filter and mild torque map |
| Third pattern | Higher than or equal to second forward speed | Normal torque filter and normal torque map |
| Fourth pattern | Higher than or equal to second forward speed | Mild torque filter and mild torque map |

SYSTEM AND METHOD OF CONTROLLING STARTING OF VEHICLE

CROSS-REFERENCE TO RELATED APPLICATION

The present application claims priority to Korean Patent Application No. 10-2013-0081596 filed on Jul. 11, 2013, the entire contents of which is incorporated herein for all purposes by this reference.

BACKGROUND OF THE INVENTION

1. Field of the Invention

The present invention relates to a system and a method of controlling starting of a vehicle. More particularly, the present invention relates to a system and a method of controlling starting of a vehicle that changes starting pattern according to a distance from a previous vehicle and performs starting control according to the changed starting pattern.

2. Description of Related Art

Generally, a starting control means a control of an engine and a transmission which is performed when the vehicle begins to run in a stopped state.

According to a conventional starting control, engine torque is controlled by using a predetermined torque filter and a predetermined torque map at a predetermined shift-speed regardless of the distance from the previous vehicle. If the predetermined shift-speed is a second forward speed, smooth shift may be felt but acceleration feel may be bad on non-congested roads. On the contrary, if the predetermined shift-speed is a first forward speed, quick acceleration may be felt but a driver may dissatisfy due to quick start or sudden acceleration on congested roads.

Therefore, it is necessary to differentiate a starting control according to a road state and the distance from the previous vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and a method of controlling starting of a vehicle having advantages of satisfying a driver's demand by differentiating starting control according to a distance from a previous vehicle.

A system of controlling starting of a vehicle may include a vehicle speed sensor detecting vehicle speed, an accelerator pedal position sensor detecting position of an accelerator pedal, a brake pedal position sensor detecting if a brake pedal is operated or not, a distance sensor detecting a distance from a previous vehicle, a timer detecting time lapse from particular time, and a controller electrically connected to the vehicle speed sensor, the accelerator pedal position sensor, the brake pedal position sensor, the distance sensor and the timer, and adapted to change starting pattern according to the distance from the previous vehicle and to perform starting control according to the changed starting pattern when the vehicle is started in a stopped state.

The controller may perform the starting control according to a first pattern if the distance from the previous vehicle is larger than or equal to a first predetermined distance.

The controller may perform the starting control according to a second pattern if the distance from the previous vehicle is smaller than the first predetermined distance and is larger than or equal to a second predetermined distance.

The controller may perform the starting control according to a third pattern if the distance from the previous vehicle is smaller than the second predetermined distance and is larger than or equal to a third predetermined distance.

The controller may perform the starting control according to a fourth pattern if the distance from the previous vehicle is smaller than the third predetermined distance.

The controller may release the starting control based on the distance from the previous vehicle if release condition of the starting control based on the distance from the previous vehicle is satisfied while the starting control is performed according to the changed starting pattern.

A method of controlling starting of a vehicle according to another exemplary embodiment of the present invention may include detecting data for starting control, determining whether the vehicle is completely stopped based on the data, determining whether a distance from a previous vehicle is larger than or equal to a first predetermined distance if the vehicle is completely stopped, and performing the starting control according to a first pattern if the distance from the previous vehicle is larger than or equal to the first predetermined distance.

Shift-speed may be adjusted to a first forward speed and engine torque may be controlled using a normal torque filter and a normal torque map in the starting control according to the first pattern.

If the distance from the previous vehicle is smaller than the first predetermined distance, the method may further include determining whether the distance from the previous vehicle is larger than or equal to a second predetermined distance, and performing the starting control according to a second pattern if the distance from the previous vehicle is larger than or equal to the second predetermined distance.

The shift-speed may be adjusted to the first forward speed and the engine torque may be controlled using a mild torque filter and a mild torque map in the starting control according to the second pattern.

If the distance from the previous vehicle is smaller than the second predetermined distance, the method may further include determining whether the distance from the previous vehicle is larger than or equal to a third predetermined distance, and performing the starting control according to a third pattern if the distance from the previous vehicle is larger than or equal to the third predetermined distance.

The shift-speed may be adjusted to be higher than or equal to a second forward speed and the engine torque may be controlled using the normal torque filter and the normal torque map in the starting control according to the third pattern.

If the distance from the previous vehicle is smaller than the third predetermined distance, the method may further include performing the starting control according to a fourth pattern.

The shift-speed may be adjusted to be higher than or equal to the second forward speed and the engine torque may be controlled using the mild torque filter and the mild torque map in the starting control according to the fourth pattern.

The method may further include determining whether release condition of the starting control based on the distance from the previous vehicle is satisfied, and releasing the starting control based on the distance from the previous vehicle if the release condition of the starting control based on the distance from the previous vehicle is satisfied.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a flowchart of a method of controlling starting of a vehicle according to an exemplary embodiment of the present invention.

FIG. 3 is a table of starting pattern according to an exemplary embodiment of the present invention.

Figure 1:
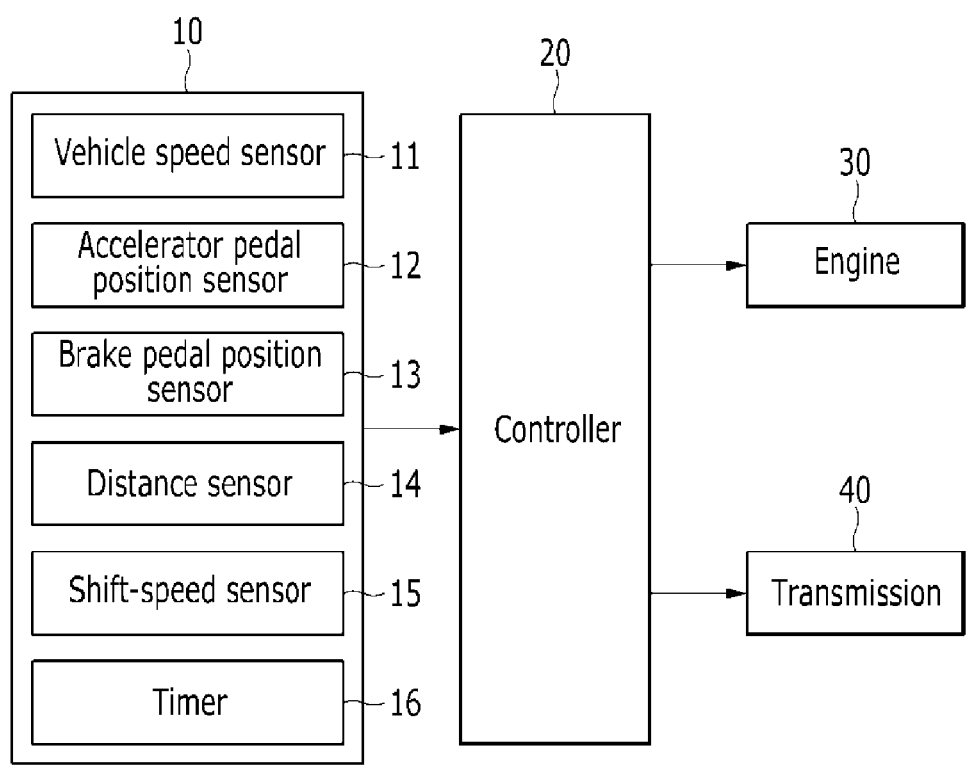
FIG. 1 is a block diagram of a system of controlling starting of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a block diagram of a system of controlling starting of a vehicle according to an exemplary embodiment of the present invention.

As shown in FIG. 1, a system of controlling starting of a vehicle according to an exemplary embodiment of the present invention includes a data detector 10, a controller 20, an engine 30 and a transmission 40.

The data detector 10 detects data for a starting control of the vehicle, and the data detected by the data detector 10 is transmitted to the controller 20. The data detector 10 includes a vehicle speed sensor 11, an accelerator pedal position sensor 12, a brake pedal position sensor 13, a distance sensor 14, a shift-speed sensor 15 and a timer 16.

The vehicle speed sensor 11 detects a vehicle speed and is mounted at a wheel of the vehicle. Alternately, the vehicle speed may be calculated based on a GPS signal received from a GPS.

The accelerator pedal position sensor 12 detects a degree with which a driver works an accelerator pedal. That is, the accelerator pedal position sensor 12 detects the data related to driver's acceleration will.

Meanwhile, a target shift-speed may be calculated by using a shift pattern based on the signal of the accelerator pedal position sensor 12 and the signal of the vehicle speed sensor 11, and the shift to the target shift-speed is controlled. That is, hydraulic pressure supplied to a plurality of friction elements or released from the plurality of friction elements is controlled in an automatic transmission provided with a plurality of planetary gear sets and the plurality of friction elements. In addition, current applied to a plurality of synchronizer devices and actuators is controlled in a double clutch transmission.

In addition, engine torque is calculated based on the accelerator pedal position and the calculated target shift-speed, and the engine 30 is controlled according to the calculated engine torque.

The brake pedal position sensor 13 determines if a brake pedal is worked or not. That is, the brake pedal position sensor 13 as well as the accelerator pedal position sensor 12 detects the driver's acceleration will. In addition, the brake pedal position sensor 13 as well as the vehicle speed sensor 11 detects whether the vehicle is completely stopped.

The distance sensor 14 detects a distance between the driver's vehicle and a previous vehicle. Various sensors such as an ultrasonic wave sensor and an infrared sensor may be used as the distance sensor 14.

The shift-speed sensor 15 detects a shift-speed that is currently engaged.

The timer 16 detects time lapse from particular time. The particular time may be time at which the vehicle is completely stopped.

The controller 20 is electrically connected to the vehicle speed sensor 11, the accelerator pedal position sensor 12, the brake pedal position sensor 13, the distance sensor 14, the shift-speed sensor 15 and the timer 16. The controller 20 changes starting pattern according to the distance from the previous vehicle based on data detected by the data detector 10 and performs the starting control by controlling the engine 30 and/or the transmission 40 according to the changed starting pattern. For these purposes, the controller 20 can be realized by one or more processors activated by a predetermined program, and the predetermined program can be programmed to perform each step of a method of controlling starting of the vehicle according to an exemplary embodiment of the present invention.

Hereinafter, referring to FIG. 2 and FIG. 3, a method of controlling starting of a vehicle according to an exemplary embodiment of the present invention will be described in detail.

FIG. 2 is a flowchart of a method of controlling starting of a vehicle according to an exemplary embodiment of the present invention, and FIG. 3 is a table of starting pattern according to an exemplary embodiment of the present invention.

As shown in FIG. 2, the method of controlling starting of the vehicle according to the exemplary embodiment of the present invention begins with detecting the data for the starting control at step S110.

That is, the vehicle speed sensor 11 detects the vehicle speed, the accelerator pedal position sensor 12 detects the degree with which the driver works the accelerator pedal, the brake pedal position sensor 13 detects if the driver works the brake pedal or not, the distance sensor 14 detects the distance from the previous vehicle, and the shift-speed sensor 15 detects the shift-speed that is currently engaged.

If the data detector 10 detects and transmits the data to the controller 20, the controller 20 determines whether the vehicle is completely stopped at step S120. That is, the controller 20 determines that the vehicle is completely stopped if the vehicle speed is 0 km/h, the brake pedal does not work, and the accelerator pedal does not work for a predetermined time T.

If the vehicle is not completely stopped at the step S120, the starting control method according to the exemplary embodiment of the present invention ends.

If the vehicle is stopped completely at the step S120, the controller 20 determines whether the distance from the previous vehicle is larger than or equal to a first predetermined distance at step S130.

If the distance from the previous vehicle is larger than or equal to the first predetermined distance, the controller 20 performs the starting control according to a first pattern at step S160. As shown in FIG. 3, the shift-speed is adjusted to a first forward speed and the engine torque is controlled using a normal torque filter and a normal torque map in the starting control according to the first pattern. Herein the torque filter means a slope with which torque increases or decreases to target torque, and the target torques under given conditions are stored in a torque map. In addition, the normal torque filter and the normal torque map means a predetermined torque filter and a predetermined torque map basically set in the vehicle.

After that, the controller 20 proceeds to step S200.

If the distance from the previous vehicle is smaller than the first predetermined distance at the step S130, the controller 20 determines whether the distance from the previous vehicle is larger than or equal to a second predetermined distance at step S140. The second predetermined distance is smaller than the first predetermined distance.

If the distance from the previous vehicle is larger than or equal to the second predetermined distance, the controller 20 performs the starting control according to a second pattern at step S170. As shown in FIG. 3, the shift-speed is adjusted to the first forward speed and the engine torque is controlled using a mild torque filter and a mild torque map in the starting control according to the second pattern. Herein, the mild torque filter is smaller than the normal torque filter, and the engine torque determined according to the mild torque map is smaller than that determined according to the normal torque map under the same conditions.

After that, the controller 20 proceeds to the step S200.

If the distance from the previous vehicle is smaller than the second predetermined distance at the step S140, the controller 20 determines whether the distance from the previous vehicle is larger than or equal to a third predetermined distance at step S150. The third predetermined distance is smaller than the second predetermined distance.

If the distance from the previous vehicle is larger than or equal to the third predetermined distance, the controller 20 performs the starting control according to a third pattern at step S180. As shown in FIG. 3, the shift-speed is adjusted to be higher than or equal to a second forward speed and the engine torque is controlled using the normal torque filter and the normal torque map in the starting control according to the third pattern.

After that, the controller 20 proceeds to the step S200.

If the distance from the previous vehicle is smaller than the third predetermined distance at the step S150, the controller 20 performs the starting control according to a fourth pattern at step S190. As shown in FIG. 3, the shift-speed is adjusted to be higher than or equal to the second forward speed and the engine torque is controlled by using the mild torque filter and the mild torque map in the starting control according to the fourth pattern.

After that, the controller 20 determines whether a release condition of the starting control based on the distance from the previous vehicle is satisfied at the step S200. The release condition of the starting control based on the distance from the previous vehicle may be satisfied when the starting control is completed or position of a shift lever is an R range.

If the release condition of the starting control based on the distance from the previous vehicle is not satisfied at the step S200, the controller 20 proceeds to the step S110. If the release condition of the starting control based on the distance from the previous vehicle is satisfied at the step S200, the controller 20 releases the starting control based on the distance from the previous vehicle at step S210 and finishes the starting control method according to the exemplary embodiment of the present invention.

As described above, since the shift is differentiated according to the distance from the previous vehicle, customer satisfaction related to driving performance may be improved according to the exemplary embodiment of the present invention.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A system of controlling starting of a vehicle comprising:
   a vehicle speed sensor detecting a vehicle speed;
   an accelerator pedal position sensor detecting a position of an accelerator pedal;
   a brake pedal position sensor detecting whether a brake pedal is operated or not;
   a distance sensor detecting a distance from a previous vehicle; and
   a controller electrically connected to the vehicle speed sensor, the accelerator pedal position sensor, the brake pedal position sensor, and the distance sensor, and adapted to change starting pattern according to the distance from the previous vehicle and to perform starting control according to a changed starting pattern when the vehicle is started in a stopped state,
   wherein the starting pattern includes torque filters, torque maps, and shift-speeds where the vehicle starts, and
   wherein the starting pattern is changed according to the distance from the previous vehicle by changing patterns of the torque filters, the torque maps, or the shift-speeds according to the distance.

2. The system of claim 1, wherein the controller performs the starting control according to a first pattern when the distance from the previous vehicle is larger than or equal to a first predetermined distance.

3. The system of claim 2, wherein the controller performs the starting control according to a second pattern when the distance from the previous vehicle is smaller than the first predetermined distance and is larger than or equal to a second predetermined distance.

4. The system of claim 3, wherein the controller performs the starting control according to a third pattern when the distance from the previous vehicle is smaller than the second predetermined distance and is larger than or equal to a third predetermined distance.

5. The system of claim 4, wherein the controller performs the starting control according to a fourth pattern when the distance from the previous vehicle is smaller than the third predetermined distance.

6. The system of claim 1, wherein the controller releases the starting control based on the distance from the previous vehicle when a release condition of the starting control based on the distance from the previous vehicle is satisfied while the starting control is performed according to the changed starting pattern.

7. A method of controlling starting of a vehicle comprising:
   detecting data for starting control;
   determining whether the vehicle is completely stopped based on the data;
   determining whether a distance from a previous vehicle is larger than or equal to a first predetermined distance when the vehicle is completely stopped; and
   when the distance from the previous vehicle is larger than or equal to the first predetermined distance, performing the starting control according to a first pattern, wherein shift-speed is adjusted to a first forward speed and engine torque is controlled using a normal torque filter and a normal torque map in performing the starting control according to the first pattern,
   when the distance from the previous vehicle is smaller than the first predetermined distance, determining whether the distance from the previous vehicle is larger than or equal to a second predetermined distance, and performing the starting control according to a second pattern when the distance from the previous vehicle is larger than or equal to the second predetermined distance wherein the shift-speed is adjusted to the first forward speed and the engine torque is controlled using a mild torque filter and a mild torque map in performing the starting control according to the second pattern.

8. The method of claim 7, when the distance from the previous vehicle is smaller than the second predetermined distance, further comprising:
   determining whether the distance from the previous vehicle is larger than or equal to a third predetermined distance; and
   performing the starting control according to a third pattern when the distance from the previous vehicle is larger than or equal to the third predetermined distance.

9. The method of claim 8, wherein the shift-speed is adjusted to be higher than or equal to a second forward speed and the engine torque is controlled using the normal torque filter and the normal torque map in performing the starting control according to the third pattern.

10. The method of claim 8, when the distance from the previous vehicle is smaller than the third predetermined distance, further comprising performing the starting control according to a fourth pattern.

11. The method of claim 10, wherein the shift-speed is adjusted to be higher than or equal to the second forward speed and the engine torque is controlled using the mild torque filter and the mild torque map in performing the starting control according to the fourth pattern.

12. The method of claim 10, further comprising:
   determining whether a release condition of the starting control based on the distance from the previous vehicle is satisfied; and
   releasing the starting control based on the distance from the previous vehicle when the release condition of the starting control based on the distance from the previous vehicle is satisfied.

* * * * *